United States Patent [19]
Bach et al.

[11] 3,824,632
[45] July 23, 1974

[54] SELF-CONTAINED WATER CLOSET AND DIGESTER

[75] Inventors: Bert Bach, New York, N.Y.; Robert Lemcke, Middleton, Wis.

[73] Assignee: Pure Way Corporation, East Moline, Ill.

[22] Filed: Oct. 6, 1972

[21] Appl. No.: 295,686

[52] U.S. Cl............................ 4/12, 4/89, 4/115, 23/259.1, 210/152
[51] Int. Cl....... E03d 5/016, Co2c 1/16, C02c 1/40
[58] Field of Search............ 4/8, 10, 12, 115, 132, 4/DIG. 4, 111, 116, 118, 89; 210/167, 169, 152, 220, 2, 11; 23/259.1; 261/122

[56] References Cited
UNITED STATES PATENTS

| | | | |
|---|---|---|---|
| 2,951,251 | 9/1960 | Belden | 4/10 |
| 3,006,476 | 10/1961 | Halpert | 210/169 |
| 3,175,887 | 3/1965 | Van Den Berg | 23/259.1 |
| 3,440,669 | 4/1969 | Boester | 4/10 |
| 3,472,390 | 10/1969 | Pall et al. | 4/10 |
| 3,579,651 | 5/1971 | Russo | 4/10 |
| 3,624,665 | 11/1971 | Klingle | 4/10 |
| 3,673,614 | 7/1972 | Claunch | 4/10 |
| 3,733,617 | 5/1973 | Bennett | 210/152 |
| 3,780,997 | 12/1973 | Hargraves | 210/220 |

*Primary Examiner*—John W. Huckert
*Assistant Examiner*—Stuart S. Levy
*Attorney, Agent, or Firm*—Eliot S. Gerber

[57] ABSTRACT

A water closet and digester are parts of a sewage disposal unit that includes filter beds, tanks for bacterial action, and a recirculating flushing water line. The solid wastes can be disintegrated by a mascerator. In one embodiment the mascerator applies pressure to the waste by using motor driven rollers having flexible surfaces.

4 Claims, 6 Drawing Figures

PATENTED JUL 23 1974  3,824,632

SELF-CONTAINED WATER CLOSET AND DIGESTER

BACKGROUND OF THE INVENTION

The present invention relates to an improved water closet and digester and more particularly to such a closet using relatively little or no additional water, but using its own recirculated water for flushing.

At the present time various chemical and water closets have been suggested for use in locations where the water supply is limited or in locations without, or inadequate, sewage disposal means. For example, in airplanes the water closet is flushed with water having coloring and disinfecting chemicals. The flushed water, along with the flushed waste, is then held in a tank for later removal. Similar systems, also relying upon a later pumping-out operation, are used in some marine toilets and toilets employed at construction sites, parks, waysides and public camping facilities. In another type of marine toilet a blade breaks up the feces, a disinfectant such as chlorine is added, and the mixture is released overboard.

All these types of water closets have three main disadvantages:

1. The pumping-out operation is messy, costly and often inconvenient;
2. It may be unfeasible to locate such water closets on the upper floors of a building under construction, or at remote camp sites or lakes, because there is no convenient way of removing the waste;
3. It may be impossible to schedule pump out time in conjunction with use conditions.

Those marine toilets using blades have difficulty in that the blades become encrusted with feces and/or entwined with other objects, making them inoperable. In addition, in some jurisdictions it may be illegal to dump waste overboard from a boat, even after adding a disinfectant and a germicide.

In some areas conventional water closets cannot be used. For example, water may be scarce or a water line may not be installed. In addition it may be impossible, due to natural barriers, perculation limitations, rock limestone, marsh, or topography, to construct septic tanks or drain fields. In most areas it is illegal to build septic systems near or in fairly close proximity to natural water bodies such as lakes, rivers, streams or wells.

The water closet is part of a mobile self-contained unit in which the waste is digested by bacterial action so that the only run-off product may be a small amount of clean water. The solid waste can be broken up by rollers which are rotated by a motor. The surfaces of the rollers are flexible and the rollers rotate in oposite directions and at different speeds, creating a shearing action.

SUMMARY OF THE INVENTION

A water closet is provided in which the "secondary" sewage treatment occurs, i.e., bacteriological action upon waste, in an activated carbon bed and the clean water is separated and recirculated for flushing the toilet bowl. The water closet is part of a mobile self-contained unit in which the only run-off product, after bacterial action, may be a small amount of clean water. At preselected times the flushing water is circulated to become a counter-current to agitate the digesting beds.

It is the objective of the present invention to provide a combined water closet and sewage disposal unit which: (1) is sufficiently light in weight, low in cost and small in size, so that it may be utilized in vehicles, construction sites, mobile homes, and other locations; (2) produces, as its only run-off by-product, water which is odorless and free of harmful bacteria; and (3) will not be likely to become clogged or otherwise require extensive or frequent maintenance.

BRIEF DESCRIPTION OF THE DRAWINGS

Other objectives of the present invention will be apparent from the detailed description, taken in conjunction with the accompanying drawings. In the drawings:

As shown in FIG. 1, the system includes a water closet 10 consisting of a lid 11, a ring-like seat 12, and a conical toilet bowl 13, all of which may be of the conventional construction found in marine toilets having impervious inner surfaces. The toilet bowl 13 has a bottom opening 14 which opens into a first main tank 15. The main tank 15 is liquid-tight and is preferably constructed with walls, top and bottom of stainless steel, or fiberglass impregnated with a suitable plastic resin, for example, polyester resin. Other materials such as thermoformed plastic, or cast concrete or any material which is basically impervious. The other tanks can be constructed of the same material and the entire system may be manufactured as an integral unit. Preferably, however, the top of each tank is separately removable and is suitably attached to the tank body.

Figure 1:
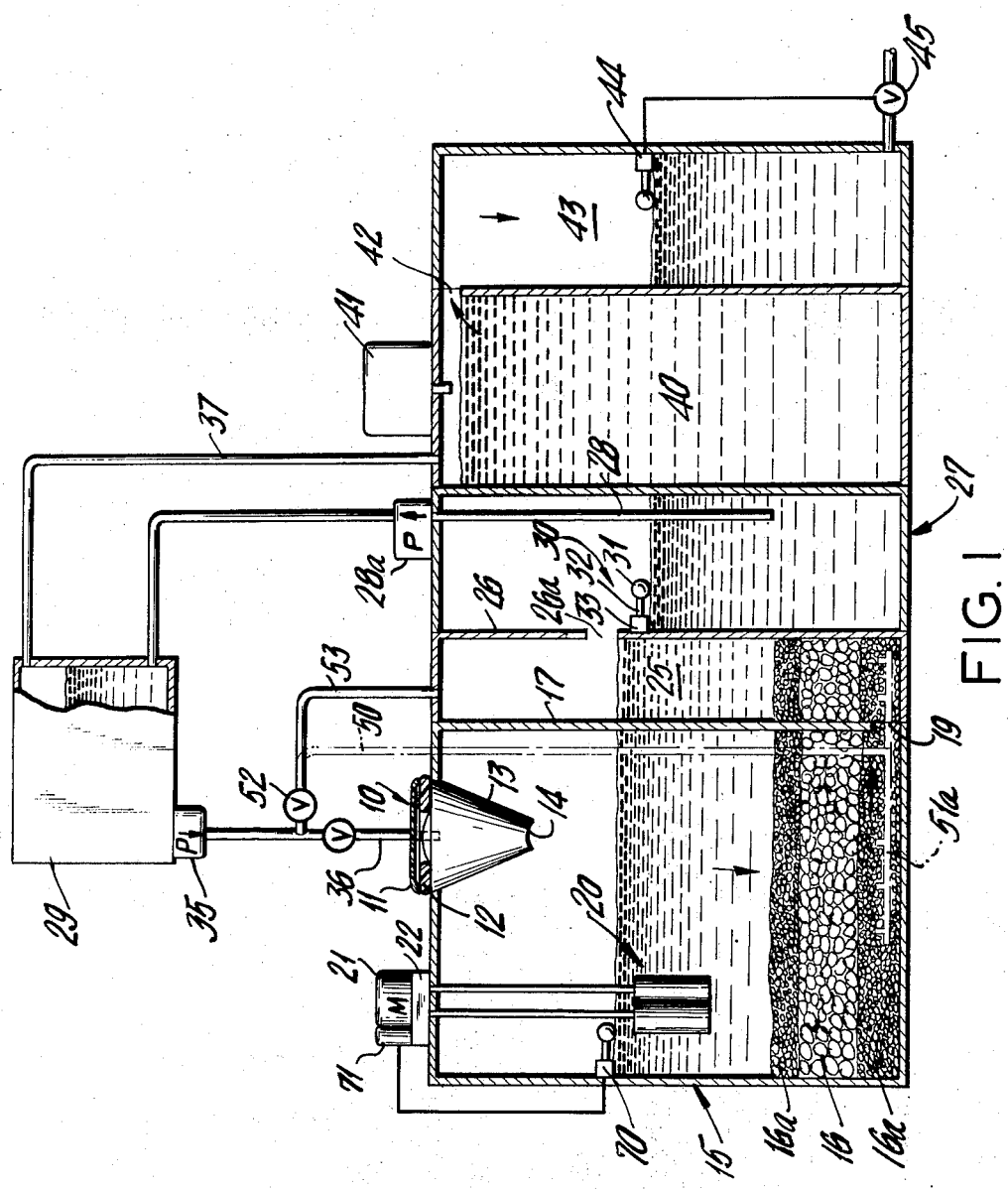
FIG. 1 is a cross-sectional diagram of the system of the present invention.

The bottom portion of tank 15 and the adjoining portion of tank 25 is filled with activated charcoal 16. The charcoal is held in place by a layer of washed gravel 16a above and below the same. A solid wall 17 of tank 15 has an opening at its bottom 19. The top of the charcoal is above opening A mascerating apparatus 20 can be positioned within the first tank 15. It consists of an electric motor 21 positioned within the first tank 15, a gear system 22 operatively connected to the motor 21, and a plurality of rotatable output shafts 23 protruding downward from the gear system. The operation of the mascerator apparatus will be described below in connection with FIGS. 3A-3C.

The opening 19 permits effluent liquid to flow to tank 25. Tank 25 also has bottom and top layers of gravel and a center layer of activated charcoal. An end wall 26 of tank 25 does not reach to the top but has an opening 26a the horizontal level of which is located between that of switch 70 and switch 33, so that when liquid rises in tank 25 it will overflow into the adjacent clean water tank 27.

A pipe 28 is positioned with its open end within tank 27. An electric liquid pump 28a is positioned on the top of the tank 27 and, when activated, pumps water from tank 27 to within the flush tank 29. The pump 28a is controlled by a float switch 30 having a float 31, a lever 32 and an immersible switch 33.

The flush tank 29 may be of conventional gravity operation construction and positioned above the water closet. Alternatively, as shown, a liquid pump 35 is positioned in flush line 36. The pump 35 may be operated by a button or handle and flushes the toilet bowl 13.

A pipe 37, whose open entry port is near the top of flush tank 29, operates as an overflow line. When the pump 28a pumps more water into flush tank 29 than is needed for flushing, the excess water flow out through 37 into tank 40. The liquid in tank 40 is treated with chlorine, other chemicals or ultra violet light. Chlorinator 41 is shown. Suitable chlorinators are available to add liquid or powdered chlorine, which acts as a disinfectant to reduce the bacterial oxygen demand of the effluent. When the liquid in tank 40 reaches the level of open port 42, it flows either out of the system or into holding tank 43. The holding tank has a float microswitch 44 which gives an indication when it is half-full, so that it may be pumped out or else controls valve 45 to open the valve to permit outflow of the liquid.

The physical breakdown of the solid feces is accomplsiehd by the mascerator. However, the biological breakdown is accomplsihed by bacteria and enzymatic action which occurs in tanks 15 and 25. The chlorine disinfectant of tank 40 is kept separated from the liquid within tanks 15, 25 and 27 because chlorine may retard or destroy the bacterial action.

The bacteria may be introduced into the system by dropping a large pill or envelope of suitable bacteria, in dry form, into tank 15. A suitable dry bacteria tablet or powder is available from Pure Way Corp. of Madison, Wisconsin. Alternatively, smaller tablets may be used which will be introduced every time, or after a predetermined number of times, that the toilet is flushed. For example, the handle operating pump 35 may, by a lever, operate a slide releasing a single small tablet into the toilet bowl or into tank 15 to deposit a tablet at each flushing.

One difficulty that has been experienced in some sewage systems using filter beds is that the beds settle and become clogged and gradually loose their efficiency. In the use of activated charcoal, or other suitable materials, such settling may occur. To avoid such a settling of the digestion bed, a counter-current flow of water is provided. Preferably the counter-current flow occurs after a predetermined number of flushings and is an injection of water from the flush tank. A counting device, for example, of the electronic or mechanical type, counts the number of flushes and, after some predetermined number, for example, sixty, opens a valve 52 permitting water flow through a line 53 from the flush tank to hydraulically counter-load the digestion bed and temporarily reverse the flow.

As shown in FIG. 1, a tube 53 coming from valve 52 goes into top of tank 25 so that when the timing cycle opens valve 52 to let water enter tank 25 (from flush tank 29) the valve 26a closes and the water level in tanks 15 and 25 rises for a short period, increasing the hydrostatic pressure and thereby washing the bed. Preferably the same counting device will also operate a mechanism to drop a bacteria tablet as described above. Alternatively, the tube 50 (shown in dashed lines) may be lead to a jet system 51a below the gravel beds in tanks 15 and 25 to back-wash those beds. The jet system 51a comprises a tube in the form of a ring within tanks 15 and 25 having upwardly directed short tubular members with upwardly directed openings.

Figure 2:
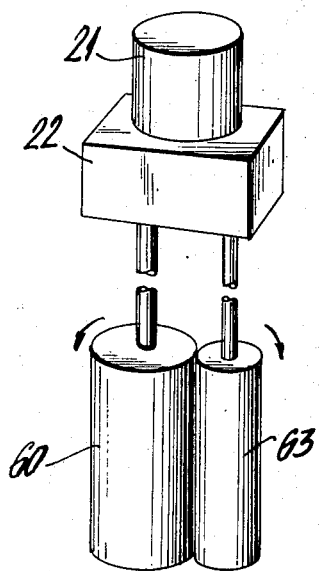
FIG. 2 is a perspective view of a possible roller mechanism and rollers.
Figure 3A:
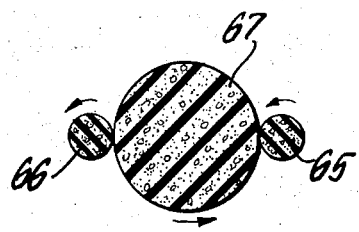
FIGS. 3A-3C are three other alternative roller arrangements shown in cross-sectional views.
Figure 3B:
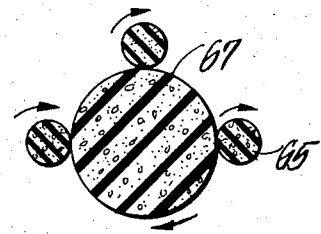
Figure 3C:
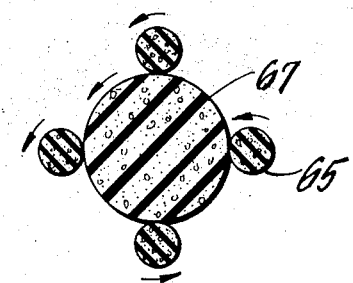
Figure 4:
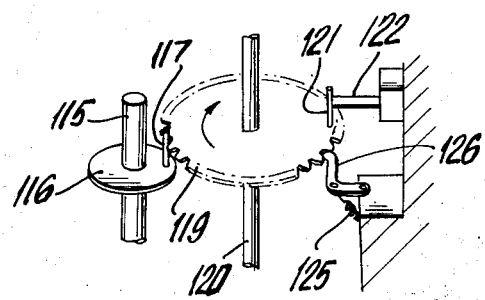
FIG. 4 shows, in perspective view, a suitable mechanical counter.

The mascerating apparatus is shown in FIG. 2 and consists of a first larger roller which is rotated by gear system 22 in a counterclockwise direction. A second roller 63, of a smaller diameter, is simultaneously rotated by gear system 22 clockwise. The gear system 22 is driven by electric motor 21. Alternative roller systems are shown in FIGS. 3A-3C. In FIG. 3A two smaller diameter rollers 65 and 66 rotate individually counterclockwise and larger diameter roller 67 also rotates counterclockwise, but at a slower speed. The embodiments of FIGS. 3B and 3C are similar to that of FIG. 3A, except in FIG. 3B three smaller diameter rollers are used and in FIG. 3C four smaller diameter rollers are used.

Preferably all the rollers have soft flexible surfaces. A suitable material is a silicone rubber which is a resilient dense foam, for example, "SILASTIC" from Dow Corning of Midland, Michigan. Alternatively, the rollers can be thick-walled balloons of synthetic rubber, for example, "Neoprene" rubber of DuPont. The rollers touch each other with a slgiht pressure and rotate in opposite directions. At the point of contact they move at slightly different linear speed to provide a shearing action. The relative speed of the rollers mentioned above relates to the speed of movement of a point on their surface, and not to their axial speed. The rollers should operate only when they are immersed in fluid. Preferably a safety float switch 70, see FIG. 1, prevents rotation when the liquid level in tank 15 is too low. The mascerating apparatus will preferably start and operate after each flushing, for example, for 5 minutes by a timer 71 activated by the flushing button.

We claim:

1. A combined water closet and digesting unit including a toilet bowl, a main tank for the biological digesting of waste and a digesting bed within said main tank and consisting of activated charcoal in which digesting bed biological action upon waste occurs, a second tank to hold water for flushing the bowl, connection means connecting said second water tank and said main tank for the flow of liquid from said main tank to said second tank, a pump connected to said second tank to take the water from the second tank for flushing, a flushing tube connected to said bowl and said pump, means to actuate said pump for flushing, a third tank for disinfecting the liquid, a disinfectant dispenser within said third tank, and an overflow orifice from said second tank to said third tank, said overflow orifice being positioned near the top of said second tank.

2. A system for the disposal and digestion of human wastes including a toilet bowl (13), a main tank (15) positioned to receive and settle waste from said bowl, an activated charcoal digesting bed (16) in said main tank within which biological action on waste occurs, a flush tank (29), means for connecting said main tank with said flush tank (28,27) to flow liquid to said flush tank, liquid connection means from said flush tank to said toilet bowl (36) to flush said bowl, means for flushing said bowl, a third tank (40) in which the liquid is disinfected, an overflow liquid connection means connecting said flush tank to said disinfectant third tank (37,40), and means within said disinfectant third tank to disinfect the liquid (41), wherein the flush tank is positioned above the main tank and a pump is part of said connecting means between said main tank and said flush tank.

3. A system as in claim 2 and also including a mascerator to mascerate waste, said mascerator being within said main tank.

4. A system as in claim 2 wherein a fourth tank is part of said connecting means between said main tank and said flush tank.

* * * * *

UNITED STATES PATENT OFFICE
CERTIFICATE OF CORRECTION

Patent No. 3,824,632   Dated July 23, 1974

Inventor(s) Bert Bach and Robert Lemcke

It is certified that error appears in the above-identified patent and that said Letters Patent are hereby corrected as shown below:

Column 2, line 45, after "opening" insert -- 19 --;

Column 3, lines 21 and 22, change "accomplsiehd" to -- accomplished --;

Column 3, line 23, change "accomplsihed" to -- accomplished --;

Column 3, line 41, change "loose" to -- lose --

Signed and sealed this 10th day of December 1974.

(SEAL)
Attest:

McCOY M. GIBSON JR.
Attesting Officer

C. MARSHALL DANN
Commissioner of Patents